United States Patent [19]

Seymour

[11] 4,119,423

[45] Oct. 10, 1978

[54] TONG GUIDE MEANS IN GLASS SHEET QUENCHING APPARATUS

[75] Inventor: Samuel L. Seymour, Oakmont, Pa.

[73] Assignee: PPG Industries, Inc., Pittsburgh, Pa.

[21] Appl. No.: 865,766

[22] Filed: Dec. 29, 1977

[51] Int. Cl.² .................... C03B 23/02; C03B 27/00
[52] U.S. Cl. ........................................ 65/104; 65/114; 65/273; 65/348
[58] Field of Search ................ 65/102, 104, 273, 348, 65/349, 350, 351, 114

[56] References Cited

U.S. PATENT DOCUMENTS

| | | | |
|---|---|---|---|
| 2,239,546 | 4/1941 | Black et al. | 65/1 |
| 3,089,727 | 5/1963 | Hay | 294/118 |
| 3,293,021 | 12/1966 | Stilley et al. | 65/111 |
| 3,333,934 | 8/1967 | Seymour | 65/32 |
| 3,340,039 | 9/1967 | Marceau | 65/348 |
| 3,346,360 | 10/1967 | O'Connell et al. | 65/104 X |
| 3,367,764 | 2/1968 | Seymour | 65/291 |
| 3,420,652 | 1/1969 | Seymour | 65/287 |
| 3,512,953 | 5/1970 | Roseman | 65/287 |
| 3,594,145 | 7/1971 | Kay | 65/273 X |
| 3,677,731 | 7/1972 | Martin | 65/102 |
| 3,846,104 | 11/1974 | Seymour | 65/104 |
| 4,006,002 | 2/1977 | Hetman, Jr. | 65/114 |

Primary Examiner—Arthur D. Kellogg
Attorney, Agent, or Firm—Dennis G. Millman

[57] ABSTRACT

In tempering glass sheets vertically hung from tongs, the uniformity with which tempering medium is applied onto the glass sheets during quenching is improved by providing the quenching apparatus with lateral restraining means which prevent side-to-side swaying of the tongs.

8 Claims, 3 Drawing Figures

TONG GUIDE MEANS IN GLASS SHEET QUENCHING APPARATUS

BACKGROUND OF THE INVENTION

A technique commonly employed in the art for tempering glass sheets, especially when the sheets are to be bent and then tempered, is to vertically hang each glass sheet from tongs which grip the upper marginal edge portion of the glass sheet, whereby the glass sheet may be conveyed while thus suspended through heating, bending, and tempeing steps. Tongs of this type are disclosed in U.S. Pat. No. 3,089,727 to W. J. Hay. The heating step entails suspending the glass sheets within a heating chamber until the temperature of the glass approaches its softening point, and then each sheet in series is conveyed out of the heating chamber and (optionally) into a bending station. A typical vertical bending operation is disclosed in U.S. Pat. No. 3,367,764 to S. L. Seymour, wherein a heat-softened glass sheet is bent by being pressed between a pair of complementary, horizontally reciprocated bending molds. After bending, with the glass sheet still at an elevated temperature, the sheet is conveyed into a tempering station where it is rapidly cooled by blasts of tempering medium so as to establish compressive stresses in the surface portions of the sheet, thereby strengthening the sheet. The tempering medium is usually air, but as used herein, the term may encompass any fluid capable of cooling a hot glass sheet. Such a process has proved to be an economical, high speed method for mass-producing tempered glass sheets, especially bent and tempered automotive glazing and the like.

One difficulty encountered with tempering glass sheets freely hung from tongs is that directing blasts of tempering medium onto the glass sheets can sometimes cause the glass sheets to sway from side to side. Although measures are ordinarily taken to equalize the force of the impingement on both sides of the glass sheet, it is usually found to be virtually impossible to precisely duplicate flow conditions on both sides of a glass sheet, particularly if it is bent, and as a result, sharp side-to-side oscillations of the glass sheet and the tongs are induced. This buffeting of the glass sheets impedes uniform application of the tempering medium onto the glass sheets, which in turn leads to imbalanced stresses in the tempered product. Such uneven stresses can result in the tempered glass sheet failing to meet strength specifications and may even cause glass breakage during processing. The problem of buffeting is especially troublesome with thin glass (i.e., glass about 4 millimeters or less in thickness), the demand for which has been increasing for use in automobiles. Not only is thin glass lighter in weight and thus more susceptible to buffeting, but also the need for faster rates of cooling to temper thin glass entails the use of higher pressure blasts of tempering medium, which additionally increases the amount of buffeting. Efforts to reduce buffeting in the prior art have included the use of guide wires extending through a quenching apparatus as shown in U.S. Pat. No. 4,006,002 to Hetman, but such an approach has not been found adequate to stabilize glass sheets in the quench to the extent desired.

SUMMARY OF THE INVENTION

In the present invention, rigid guide means are provided in a glass sheet tempering apparatus to restrict side-to-side movement by the glass sheet gripping tongs, thereby substantially reducing buffeting of the glass sheets and improving the uniformity with which tempering medium is directed onto the glass. The guide means preferably take the form of a pair of rigid, elongated side restraints defining a narrow channel through which the tongs may pass in a longitudinal direction while being closely confined in the transverse direction. The lateral restraining action of the guide means may advantageously be supplemented with glass sheet-engaging guide wires extending longitudinally through the tempering station for further limiting the degree of lateral motion permitted to the glass sheets. The invention is especially useful in connection with the tempering of thin glass with high pressure blasts of tempering medium.

THE DRAWINGS

DETAILED DESCRIPTION

Figure 1:
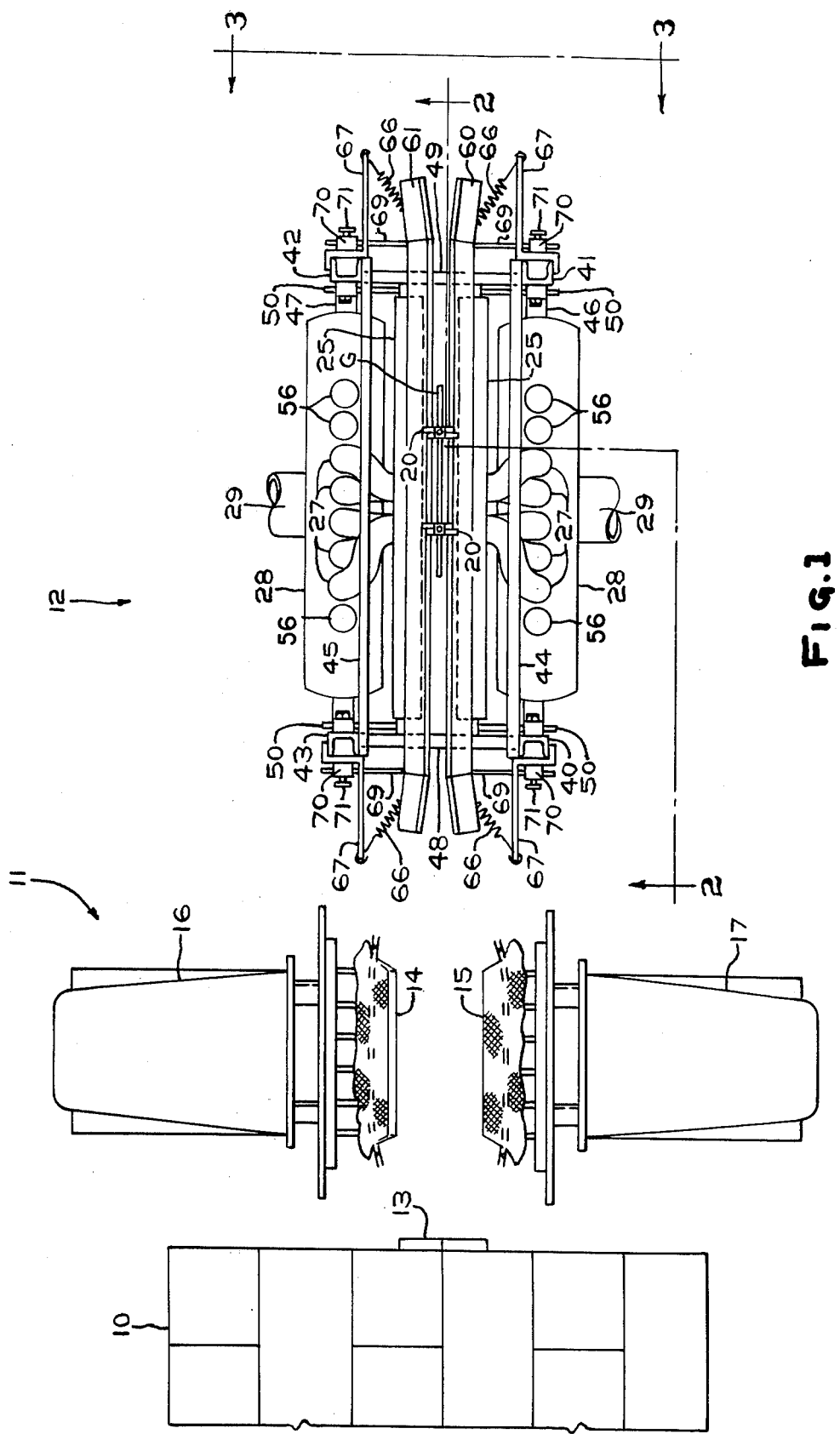
FIG. 1 is a plan view of a typical glass sheet bending and tempering operation, showing the exit end of a heating furnace, a press bending station, and a quenching station incorporating the tong guide means of the present invention.

In FIG. 1, there is shown a general layout of a typical glass sheet bending and tempering operation wherein a series of tong-supported glass sheets are heated in a furnace 10 and then conveyed in sequence to a press bending station 11 and a quenching station 12. The specific arrangement shown and described in detail herein is merely typical of the type of operation in which the present invention may find utility. It should be clear that the present invention relates to any arrangement wherein glass is vertically hung from tongs as it is being tempered. While such an arrangement is most typically employed for bending and tempering glass sheets, a bending step may be considered optional for the purposes of the present invention.

In the specific embodiment of FIG. 1, each glass sheet is continuously conveyed by tongs through furnace 10 where they are heated to a temperature near the softening point of the glass (e.g., about 1200° F., 650° C.). Through each step the glass sheets are maintained with their major surfaces generally parallel to their direction of travel. Each glass sheet leaves the furnace through an exit door 13 and is conveyed into bending station 11 where it is stopped between a pair of complementary shaping members 14 and 15. The shaping station shown is of the type disclosed in U.S. Pat. No. 3,367,764 to S. L. Seymour, and reference may be had thereto for further details of its construction and operation. Briefly, the shaping members 14 and 15 are covered with a knitted fiber glass fabric and are carried on opposed, horizontally reciprocating presses 16 and 17. After the glass sheet has been bent to the desired shape, it is conveyed into the quenching station 12. Sufficient heat is imparted to the glass in the furnace so that as it enters the quenching station it has not cooled below a temperature suitable for tempering.

Figure 2:
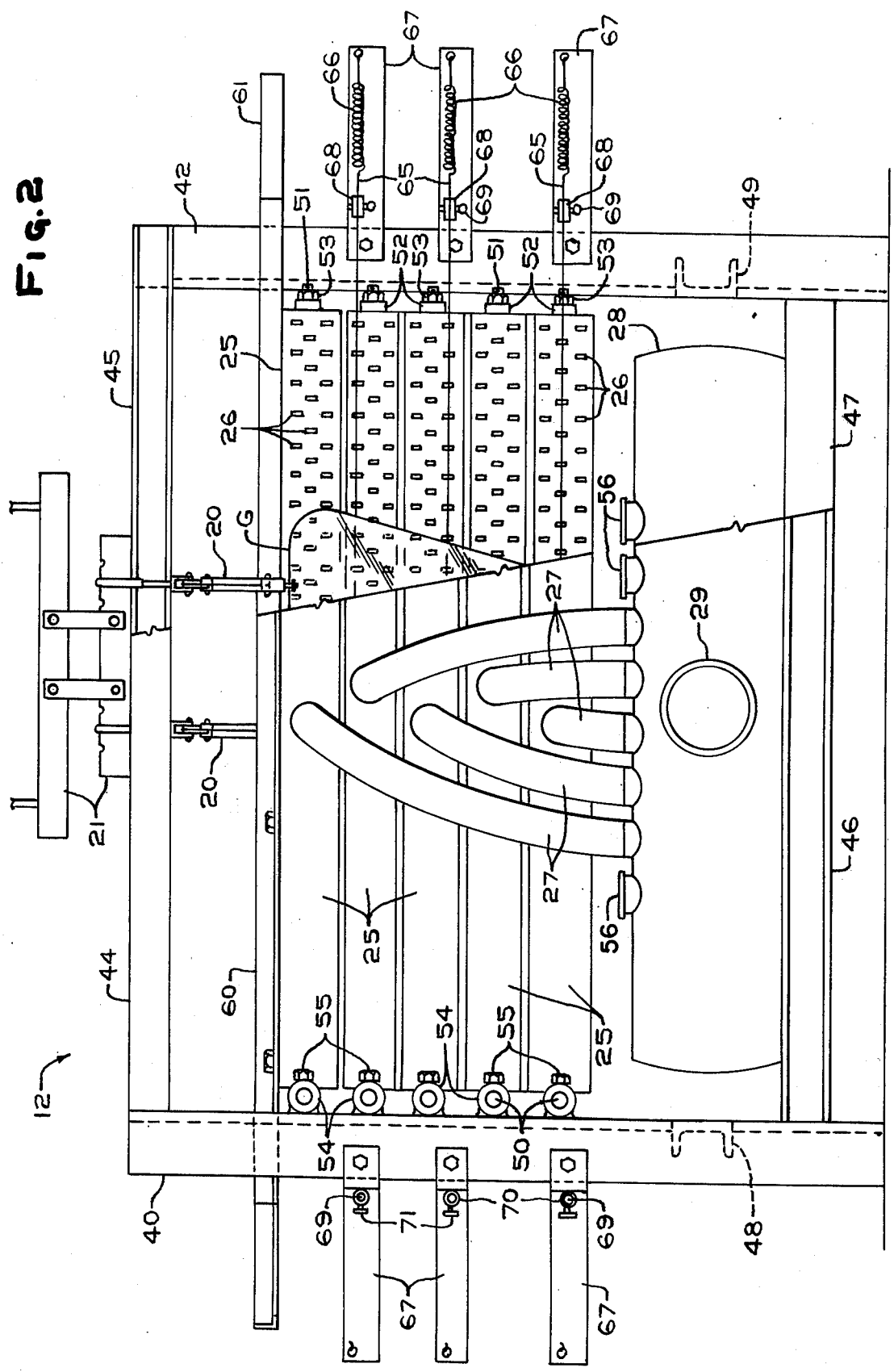
FIG. 2 is a side view, partially broken away, of the quenching station of FIG. 1 taken along lines 2—2 in FIG. 1.
Figure 3:
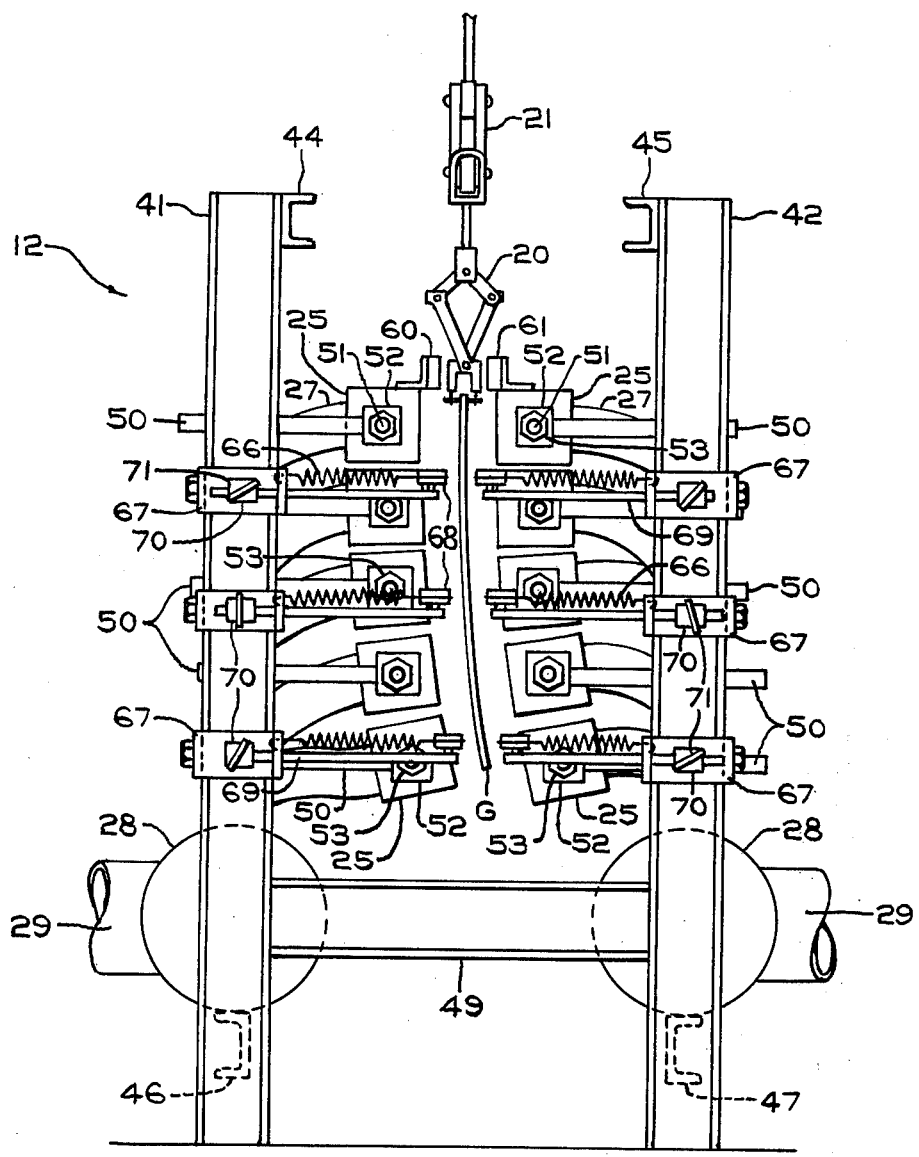
FIG. 3 is an end view of the quenching station of FIG. 1 taken along lines 3—3 in FIG. 1.

In the drawings, a sheet of glass G on a pair of tongs 20 is shown passing through the quenching station. For the sake of clarity, the overhead support means for the tongs and the conveying means have not been shown in FIG. 1. As can be seen in FIGS. 2 and 3, the tongs are carried by an overhead carriage assembly 21 which rides on a suitable conveyor means, such as a stub roll conveyor (not shown), which extends overhead in the longitudinal direction (the direction of glass travel) through the furnace and over the bending station and the quenching station. Details of the tong construction itself may be found in U.S. Pat. No. 3,089,727 to W. J. Hay.

The particular quenching apparatus depicted in the drawings is particularly suited for directing high pressure blasts of air onto relatively thin sheets of glass for imparting a high degree of temper thereto. Referring now to FIGS. 2 and 3 in particular, it may be seen that the quenching apparatus centers around a series of horizontally extending quench modules 25 stacked vertically in opposing banks on opposite sides of the path of glass travel. Each of the quench modules, on its glass-facing surface, includes a large number of staggered, slot-shaped orifices 26 from which high pressure blasts of air issue. The hollow interior of each quench module 25 is supplied with pressured air through a flexible conduit 27 which leads from one of a pair of air reservoirs 28. The reservoirs 28 are, in turn, supplied with pressurized air from an air compressor (not shown) by way of conduits 29.

An advantageous feature of the quenching apparatus shown in the drawings is its wide range of adaptability to varying sizes and shapes of glass sheets. The quench modules are mounted in a free-floating fashion to a rigid frame so that their elevation and lateral position, as well as their angular attitude, may be readily altered without the need for substantial reconstruction of the quenching apparatus. The rigid frame consists of four corner posts 40, 41, 42, and 43 joined by a pair of upper longitudinal cross-braces 44 and 45, a pair of lower longitudinal cross-braces 46 and 47, and a pair of transverse cross-braces 48 and 49. Each quench module 25 is mounted onto the frame independently by way of a pair of horizontally extending rods 50. Each end of each quench module 25 is rotatably joined to one of the rods 50 by means of threaded mounting post 51 extending from the end of the quench module. Each mounting post 51 is journaled in a bearing block 52 affixed to the inner end of the respective rod 50. The angular position of the quench modules is fixed by tightening nuts 53 which are threaded onto the end of the mounting posts 51. The opposite end of each rod 50 is received in a sleeve 54 which is affixed to one of the frame corner posts. A set screw 55 extends through each sleeve 54 to lock each rod 50 in place. By this arrangement, the glass-to-quench module spacing may be easily adjusted by loosening the set screws 55 and sliding rods 50. The angle at which the air blasts are directed toward the glass sheet may be adjusted by loosening nuts 53. The height of the quenching area may be altered by adding additional quench modules or by removing quench modules. For example, in the apparatus illustrated in the drawings, the frame is adapted to receive up to about 3 additional quench modules, and the air reservoirs 28 are shown as having extra ports 56 (shown capped) which may be employed to supply pressurized air to such additional quench modules. By thus providing a close correspondence between the height of the quench area and the height of the glass sheets being processed, maximum efficiency in the use of compressed air is attained.

When a glass sheet enters the space between the opposed banks of quench modules 25, it is impinged on both sides with blasts of tempering medium from orifices 26. The undesirable buffeting of the glass sheet normally encountered at this stage of the process is counteracted in the present invention by means of a pair of tong guide members 60 and 61 which flank the path taken by a lower portion of the tongs as they pass through the quench in the longitudinal direction. The tong guides may take the form of any rigidly supported member which will prevent the tongs from swinging laterally to an appreciable extent. The spacing between the barriers should be just slightly wider than the width of the portion of the tongs lying between the barriers, thereby permitting the tongs to move freely in the longitudinal direction while limiting lateral movement of the tongs. In the preferred embodiment shown, each guide member takes the form of an elongated strip of lightweight sheet metal bent to an L-shaped cross section which may be bolted to the top of one of the upper quench modules 25. The guide means extend at least the full length of the quench and preferably slightly beyond both ends of the quench and may be provided with flared entrance and exit throats in order to avoid snagging the tongs.

A specific tong construction and its preferred alignment with the tong guide means have been illustrated in the drawings, but it should be understood that other tong configurations may be used, in which case the alignment between the tongs and the tong guides must be determined on an individual basis. In general, the alignment should be chosen to limit contact to the lower portions of the tongs, since the lower portions have the greatest freedom of movement and since pressure on the sides of the upper portions could cause the tongs to lose their grip on the glass.

The tong guide means of the present invention may advantageously be deployed in combination with a plurality of guide wires 65, which extend horizontally through the quench between the opposing banks of quench modules and on opposite sides of and parallel to the path taken by the glass sheets passing through the quench. These wires limit lateral motion of the glass sheets without significantly blocking the flow of quenching medium. Each guide wire 65 is maintained taut by a pair of springs 66 which draw the wire against grooved guide rollers 68 at opposite ends of the wire. In the preferred embodiment shown in the drawings, the quench apparatus includes an advantageous, self-contained mounting arrangement for the guide wires which permits a wide range of adaptability to different sizes and shapes of glass sheets. Each end of each guide wire is provided with a mounting bracket 67, which includes a longitudinally extended arm to which the outer end of each spring 66 is attached and a bifurcated opposite end which is bolted to one of the frame corner posts 40, 41, 42, or 43. Each guide roller 68 is rotatably carried at the end of an extension rod 69 which is mounted for adjustment in the horizontal direction transverse to the direction of glass travel. Each extension rod 69 extends through a bore in the longitudinal arm of respective mounting bracket 67 and through a sleeve 70 carried on the bifurcated portion of the mounting bracket. The transverse location of each roller may be fixed by tightening a set screw 71 which is threaded through each sleeve 70. Thus, the elevation of the guide wires may be changed to accommodate taller or shorter sheets of glass simply by relocating the mounting brackets 67 on the corner posts of the frame, and the horizontal location of the guide wires may be adjusted to closely correspond to any given contour of bent glass sheets by extending or retracting the extension rods 69.

It should be understood that other variations and modifications as are known to those of skill in the art may be resorted to without departing from the spirit and scope of the invention as defined by the appended claims.

I claim:

1. An apparatus for tempering glass sheets comprising:
   a furnace adapted to heat glass sheets to a temperature suitable for tempering;
   a quenching station including a pair of opposed arrays of orifices adapted to direct blasts of tempering medium in a generally horizontal direction onto opposite surfaces of a glass sheet received therebetween; and
   means for conveying a glass sheet from the furnace into the quench station along a longitudinal path between said arrays of nozzles, said conveying means including tongs adapted to grip an upper marginal edge portion of a glass sheet so as to support the glass sheet in a generally vertical disposition;
   wherein said quenching station includes rigid guide means mounted above said arrays of nozzles and parallel to and flanking said longitudinal path taken by said tongs through the queching station, said guide means being located to face lower end portions of the tongs passing through the quenching station in closely spaced relationship thereto so as to closely limit transverse motions of the tongs.

2. The apparatus of claim 1 wheren said guide means comprises a pair of longitudinally extending, vertically upstanding surfaces spaced apart so as to form a narrow channel along which the tongs may pass.

3. The apparatus of claim 2 wherein said channel extends along at least the length of said arrays of quenching orifices.

4. The apparatus of claim 1 wherein said quenching station further includes a plurality of guide wires extending horizontally between said arrays of nozzles closely adjacent and parallel to the path taken by the glass sheets passed through the quenching station adapted to closely limit transverse motions of the glass sheets.

5. A method of tempering a series of glass sheets comprising:
   gripping an upper marginal edge portion of each glass sheet with tongs so as to support each glass sheet in a generally vertical position;
   while thus supported, conveying each glass sheet through a heating chamber wherein the glass is heated to a temperature suitable for tempering and then through a quenching station wherein blasts of tempering medium are directed onto opposite sides of each glass sheet to impart a temper thereto;
   wherein the improvement comprises reducing buffeting of the glass sheets by the blasts of tempering medium by restricting side-to-side motions of the tongs with rigid tong guide means closely spaced from and flanking the path taken by the tongs through the quenching station.

6. The method of claim 4 wherein buffeting of the glass sheets by the blasts of tempering medium is further reduced by restricting side-to-side motions of the glass sheets with guide wires extending through the quenching station closely spaced from the path taken by the glass sheets through the quenching station.

7. The method of claim 4 wherein the glass sheets are bent after leaving the heating chamber and before entering the quenching station.

8. The method of claim 6 wherein the glass sheets are no more than about 4 millimeters in thickness.

* * * * *